US011650556B2

(12) United States Patent
Sandhu et al.

(10) Patent No.: US 11,650,556 B2
(45) Date of Patent: May 16, 2023

(54) CONTINUOUS MONITORING AND CONTROL OF MULTIPLE UTILITY CONSUMPTION IN A BUILDING

(71) Applicant: Teghpal Singh Sandhu, Sea Cliff, NY (US)

(72) Inventors: Teghpal Singh Sandhu, Sea Cliff, NY (US); Thomas Lee, Middle Village, NY (US); Arthur Yu Chan, Maspeth, NY (US)

(73) Assignee: Teghpal Singh Sandhu, Sea Cliff, NY (US)

( * ) Notice: Subject to any disclaimer, the term of this patent is extended or adjusted under 35 U.S.C. 154(b) by 28 days.

(21) Appl. No.: 17/350,225

(22) Filed: Jun. 17, 2021

(65) Prior Publication Data

US 2021/0397145 A1 Dec. 23, 2021

Related U.S. Application Data

(60) Provisional application No. 63/040,251, filed on Jun. 17, 2020.

(51) Int. Cl.
*G05B 15/02* (2006.01)
*G06F 16/2455* (2019.01)
(Continued)

(52) U.S. Cl.
CPC .......... *G05B 15/02* (2013.01); *G06F 16/248* (2019.01); *G06F 16/24568* (2019.01); *G06F 16/258* (2019.01); *G06Q 30/016* (2013.01); *G06Q 50/06* (2013.01); *G06Q 50/163* (2013.01)

(58) Field of Classification Search
CPC .......... G05B 15/02; G05B 2219/25011; G05B 2219/2639; G06F 16/24568; G06F 16/248; G06F 16/258; G06Q 30/016; G06Q 50/06; G06Q 50/163
See application file for complete search history.

(56) References Cited

U.S. PATENT DOCUMENTS

| 2003/0019230 A1* | 1/2003 | Gether | F24F 5/0017 |
| | | | 62/238.7 |
| 2003/0023178 A1* | 1/2003 | Bischoff | A61B 5/681 |
| | | | 600/515 |

(Continued)

OTHER PUBLICATIONS

International Search Report and Written Opinion of the ISA issued in connection with PCT Application No. PCT/US21/37763, dated Sep. 16, 2021, pp. 1-21.

*Primary Examiner* — Tuan C Dao
(74) *Attorney, Agent, or Firm* — Hoffmann & Baron, LLP

(57) ABSTRACT

A method for monitoring and controlling multiple utility consumption in a building includes: obtaining, by a first server, real-time utility usage data from a plurality of utility devices associated with the building; parsing the utility usage data obtained by the first server to generate individual data streams including utility consumption information; and storing the individual data streams in a database. The method further includes: obtaining, by a second server, at least a subset of the individual data streams from the database based on a client request for the utility consumption information; parsing and aggregating, by the second server, at least the subset of the obtained individual data streams and returning the parsed and aggregated data streams to a requesting client; and displaying the parsed and aggregated data streams, presenting to the client information regarding the multiple utility consumption associated with the building in a prescribed format controlled by the client.

17 Claims, 10 Drawing Sheets

(51) Int. Cl.
    *G06F 16/25*     (2019.01)
    *G06F 16/248*     (2019.01)
    *G06Q 50/06*     (2012.01)
    *G06Q 30/016*     (2023.01)
    *G06Q 50/16*     (2012.01)

(56) References Cited

U.S. PATENT DOCUMENTS

| | | | |
|---|---|---|---|
| 2003/0102979 A1* | 6/2003 | Jednacz | H04L 45/48 340/9.1 |
| 2005/0150211 A1* | 7/2005 | Crawley | F01N 3/0256 60/272 |
| 2005/0262258 A1* | 11/2005 | Kohno | H04N 21/262 348/E7.071 |
| 2006/0117365 A1* | 6/2006 | Ueda | H04N 21/8586 |
| 2012/0089523 A1* | 4/2012 | Hurri | G06Q 30/016 702/62 |
| 2012/0290230 A1* | 11/2012 | Berges Gonzalez | G01D 4/004 702/61 |
| 2015/0276251 A1* | 10/2015 | Smullin | F24F 11/46 706/58 |
| 2015/0308856 A1* | 10/2015 | Srinivasan | H04L 67/125 340/870.02 |
| 2016/0085810 A1* | 3/2016 | de Castro Alves | G06F 16/24568 707/752 |
| 2017/0053360 A1* | 2/2017 | Loeb | G06Q 50/06 |
| 2018/0343507 A1* | 11/2018 | Petri | H04Q 9/00 |
| 2019/0095644 A1 | 3/2019 | Park et al. | |
| 2019/0260204 A1 | 8/2019 | Koval et al. | |
| 2019/0278441 A1* | 9/2019 | Haupt | G01D 7/00 |
| 2020/0184395 A1 | 6/2020 | Fabris et al. | |

* cited by examiner

CONTINUOUS MONITORING AND CONTROL OF MULTIPLE UTILITY CONSUMPTION IN A BUILDING

CROSS-REFERENCE TO RELATED APPLICATIONS

This application claims priority to U.S. Provisional Patent Application No. 63/040,251 filed Jun. 17, 2020, entitled "Continuous Monitoring and Control of Multiple Utility Consumption in a Building," the disclosure of which is incorporated by reference herein in its entirety for all purposes.

BACKGROUND

The present invention relates generally to the electrical, electronic and computer arts, and, more particularly, relates to an integrated platform for providing real-time monitoring of multiple utility usage in a building, and for generating control signals for controlling building environmental equipment for regulating utility usage within prescribed target thresholds.

Data analytics can be a useful tool to the utility industries. Utilities have traditionally analyzed data to optimize their operation and processes. Until recently, however, has not been much data to analyze. This is now changing with the advent of new sources of data, including, but not limited to, transmission data, using technologies such as phasor measurement units (PMUs), distribution data, meter data, etc., using devices such as smart meters and advanced metering infrastructure (AMI), asset data, geographic information system (GIS) data, etc.

A given building, whether it be residential or commercial, typically contracts with several different types of utility suppliers (e.g., electric, gas, oil, water, etc.), with each utility supplier accessing on-premises metering units using its own communications protocol for obtaining customer usage information relating to the building. This customer usage information is primarily used for customer billing purposes. The use of multiple communications protocols across the various customer premises metering equipment and utility suppliers, among other factors, has made it challenging to integrate multiple utility data into a common platform. Furthermore, customers generally do not have access to real-time utility usage information, and therefore are not able to modify their activity in any meaningful manner to optimize their utility consumption.

SUMMARY

The present invention, as manifested in one or more embodiments thereof, is directed to methods and apparatus for providing customer access to multiple different types of utility information for real-time monitoring and controlling of utility consumption in a building, integrated into a common interface platform. In one or more embodiments, novel software is provided which deconstructs different types of utility consumption information into individual data streams, allowing customers to beneficially analyze and diagnose costly usage inefficiencies in real time and thereby optimize their utility usage. The system according to one or more embodiments of the invention is advantageously configured to automatically generate control signals for controlling building environmental equipment for regulating utility usage in the building to within prescribed target thresholds.

In accordance with an embodiment of the invention, a method for monitoring and controlling multiple utility consumption in a building includes: obtaining, by at least a first server, real-time utility usage data from a plurality of utility devices associated with the building; parsing the utility usage data obtained by the first server to generate individual data streams including utility consumption information; and storing the individual data streams in a database. The method further includes: obtaining, by at least a second server, at least a subset of the individual data streams from the database based on a client request for the utility consumption information; parsing and aggregating, by the second server, at least the subset of the obtained individual data streams and returning the parsed and aggregated data streams to a requesting client; and displaying the parsed and aggregated data streams, presenting to the client information regarding the multiple utility consumption associated with the building in a prescribed format controlled by the client.

In accordance with another embodiment of the invention, an apparatus for monitoring and controlling multiple utility consumption in a building includes a memory and at least one processor coupled with the memory. The processor is configured: to obtain, by at least a first server executing on the at least one processor, real-time utility usage data from a plurality of utility devices associated with the building; to parse the utility usage data obtained by the first server to generate individual data streams including utility consumption information; to store the individual data streams in the memory; to obtain, by at least a second server executing on the at least one processor, at least a subset of the individual data streams from the memory based on a client request for the utility consumption information; to parse and aggregate, by the second server, at least the subset of the obtained individual data streams and to return the parsed and aggregated data streams to a requesting client; and to send, to a display device coupled with the apparatus, the parsed and aggregated data streams presenting information regarding the multiple utility consumption associated with the building in a prescribed format controlled by the client.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a non-transitory computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques as disclosed herein can provide substantial beneficial technical effects. By way of example only and without limitation, one or more embodiments may provide one or more of the following advantages:

provides cohesive real-time data system, aggregating multiple types of utility consumption data into a common platform;

provides the ability to set maximum usage thresholds across multiple utility types and to broadcast real-time alerts when usage exceeds those prescribed thresholds;

automates data collection in real time for multiple utility providers and consumption monitoring devices;

provides a visual dashboard that can be customized by the user, clearly presenting real-time building consumption information, as well as historical usage patterns, in a graphical format;

provides the ability to access real-time building usage and analytics information remotely, using a cloud-based data processing platform;

provides layered access from a total integrated system to one-to-one data point access for a user;

provides the ability to integrate the system with building environmental and control equipment for automatically regulating building environmental parameters (e.g., temperature, humidity, lighting, etc.) based on a comparison of real-time utility usage with prescribed utility usage profiles, environmental conditions, etc., or automatically taking certain actions in response to a detected probable alert condition (e.g., gas or water leak).

These and other features and advantages will become apparent from the following detailed description of illustrative embodiments thereof, which is to be read in connection with the accompanying drawings.

BRIEF DESCRIPTION OF THE DRAWINGS

Non-limiting and non-exhaustive embodiments of the present invention will be described with reference to the following drawings which are presented by way of example only, wherein like reference numerals (when used) indicate corresponding elements throughout the several views unless otherwise specified, and wherein.

Figure 1:
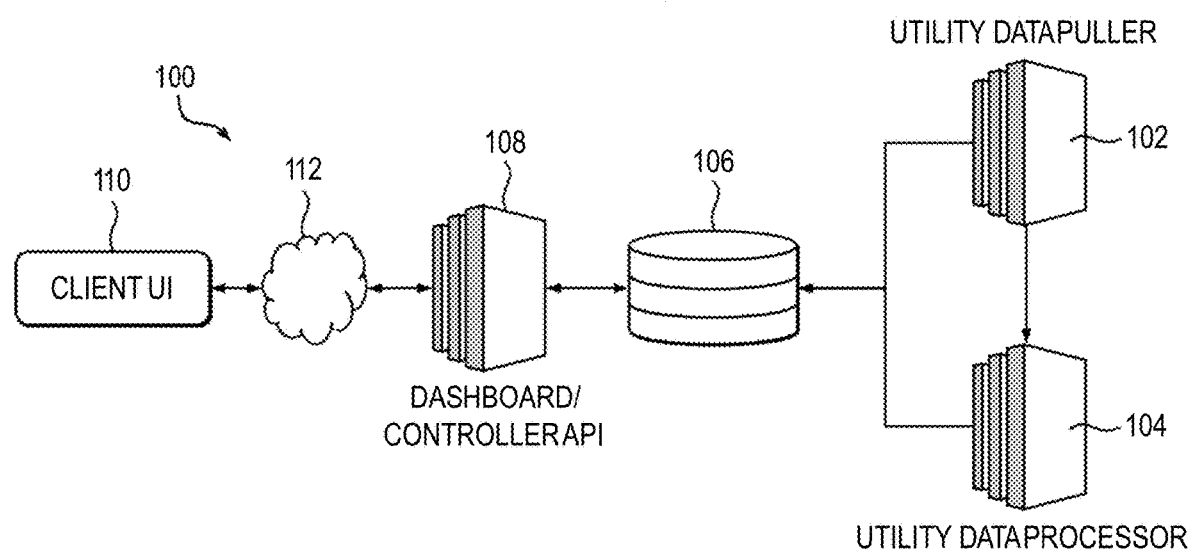
FIG. 1 is a top-level block diagram depicting at least a portion of an exemplary system including first, second and third servers, suitable for use in conjunction with one or more embodiments of the present invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present disclosure will be described herein in the context of illustrative apparatus and methods for providing real-time access to different utility usage information associated with a building and integrating such information into a common interface platform. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

As previously stated, the use of different communications protocols for accessing customer premises metering equipment and incompatible data types for various utility providers, among other factors, has made it challenging to integrate utility consumption information and analytics into a common platform. Additionally, customers generally do not have access to real-time utility usage information, and therefore are not able to optimize their utility consumption activity in real time.

Until now, there has been no centralized database to view disparate real-time utility data. Utility and consumption data from point-of-entry meters (i.e., utility meters), as well as sub-meters, do not provide real-time analytics. Furthermore, data from different utility providers is not presently centralized in one place, primarily because different utility providers generally have their own communications protocols and data formats that are often incompatible with one another. For example, the Department of Environmental Protection (DEP) is the water utility for New York City, National Grid is the gas supplier, and Consolidated Edison is the electric and gas supplier, only in certain areas; each of these utility providers uses a different type of metering device, data format and/or communications protocol.

Traditionally, there exist rudimentary systems and procedures for "pulling" or "scraping" old utility bills, manual uploads, and spreadsheets used by building management or ownership to track utility consumption; manual processes were put in place to determine whether usage was within prescribed targets. However, such utility usage tracking was not performed in real-time, but rather monthly or even quarterly. In other words, there was no cohesive real-time data system that would trigger alerts, integrate workflow and users, and help find and fix utility consumption issues immediately. Instead, users were relying on false benchmarks, incorrect data, or older data, to try and manage utility consumption.

In order to overcome at least the aforementioned problems and disadvantages, embodiments of the present invention are directed to providing customer access to multiple types of utility consumption information associated with a building (or buildings) in real time, beneficially integrated into a common interface platform. In one or more embodiments, novel software is provided which deconstructs the different utility consumption information into individual data streams, allowing customers to beneficially analyze and diagnose costly utility usage inefficiencies in real time. In some embodiments, the system according to aspects of the invention is configured to automatically initiate certain actions, such as, for example, by generating control signals for adjusting building heating, ventilation and air-conditioning (HVAC) and/or other environmental control equipment in a building based on real-time utility usage in the building being outside of prescribed thresholds (e.g., utility usage profiles, ranges, etc.).

By way of example only and without limitation or loss of generality, Table 1 below illustrates several different utility data sources, data collection methods, metering locations, and types of data provided, which may be integrated using a system according to aspects of the present invention.

TABLE 1

| Utility | Data Collection Method | Location(s) | Data Provided |
|---|---|---|---|
| Electricity | On-site Smart meter | Electrical room in each building | Real-time electric consumption for each building |
| Water | DEP AMR and on-site meter | Main water meter in each building | Real-time water consumption for each building |
| Heating gas | On-site Smart meter | Connected to main gas meter at the complex | Real-time gas consumption for the complex |
| Cooking gas | Software compiling utility billing data | No on-site hardware | Cooking gas consumption for each building |
| Oil | On-site oil gauge | Oil tank for each building | Real-time oil consumption for each building |

With reference now to the drawings, FIG. 1 is a top-level block diagram depicting at least a portion of an exemplary system 100 in which one or more embodiments of the invention are implemented. The system 100 includes a first server 102, which in this illustrative embodiment is configured to execute a utility data puller, and a second server 104, which in this illustrative embodiment is configured to execute a utility data processor. The first and second servers 102, 104 are in operative communication with a data store or other storage medium 106, and with one another. In one or more embodiments, all data used by the system 100 is stored within the data store 106, including, for example, recorded utility date (both historical and current), user account information, building and company information, etc. The system 100 further includes a third server 108, which in this illustrative embodiment is configured to execute a dashboard/controller application programming interface (API), and a client user interface (UI) 110. The third server 108 is in operative communication with the data store 106 and the client UI 110, either directly or through a communications network 112 (wired or wireless), such as the Internet.

Each of the first server 102, second server 104 and third server 108 are preferably instantiated on at least one processor; in some embodiments, more than one server may be instantiated on the same processor, and in other embodiments, a single server may be instantiated on multiple processors operating in a distributed manner. Furthermore, in one or more embodiments, at least one of the first server 102, second server 104 and third server 108 may comprise, for example, an Amazon EC2 instance configured to interface with an Amazon Relational Database Service (RDS) PostgreSQL instance running on an internal environment data store (e.g., data store 106) or an external environment data store, although embodiments of the invention are not limited to any specific operating software or platforms employed.

In one or more embodiments, the first server 102 is configured to handle a majority of data extraction (i.e., data pulling) from hardware premises equipment (e.g., point-of-entry meters, sub-meters, etc.), used to measure utility consumption in a given building, and from other external API/websites, and to control other data retrieving software. For example, the first server 102, in one or more embodiments, is configured to obtain data from devices/APIs as well as from bills and billing data from websites of utility providers (e.g., Consolidated Edison (ConEd)—an energy company based in New York, Department of Environmental Protection (DEP), etc.). Preferably, all data pulling software resides in the same software module which runs on the first server 102. The second server 104, in one or more embodiments, is configured for processing data and may, in some cases, assist in the data extraction performed by the utility data puller executing on the first server 102. The third server 108, in one or more embodiments, is configured to control user web requests received from the client UI 110, to load, aggregate and/or parse data retrieved from the data store 106, and/or to return formatted data for use by the client UI. The client UI 110, in one or more embodiments, provides an interface through which a customer/user can access one or more components of the system 100, for obtaining information relating to an operation of the system or for controlling the operation thereof.

Figure 2:
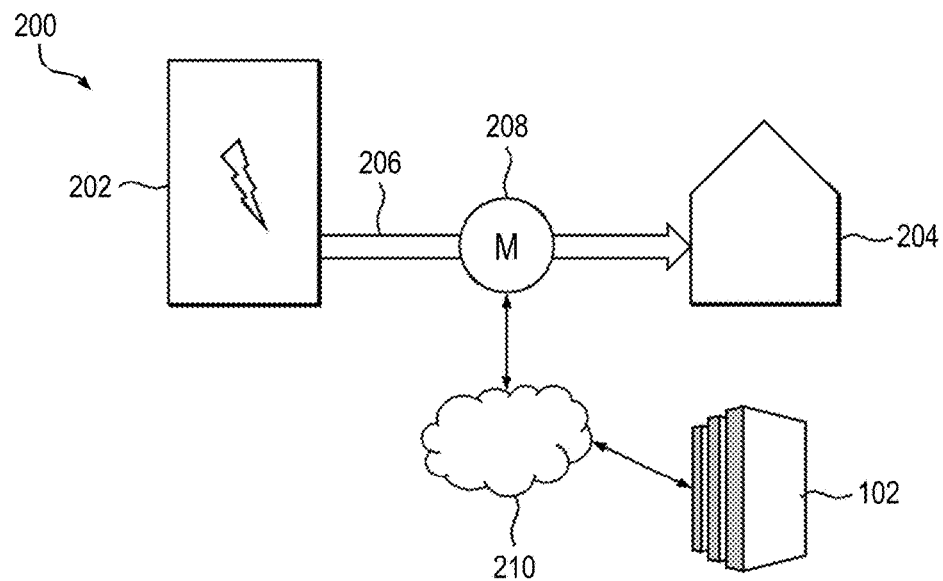
FIG. 2 is a block diagram conceptually illustrating a basic system for obtaining utility consumption information suitable for use in conjunction with one or more embodiments of the present invention.

FIG. 2 is a block diagram conceptually illustrating a basic system 200 for obtaining utility consumption information suitable for use in conjunction with one or more embodiments of the invention. In the system 200, a utility provider (e.g., electric utility) 202 supplies energy to a building (e.g., a residential home) 204 via a utility distribution conduit 206, which may be in the form of, for example, a power transmission line (for an electric utility), a gas line (for a gas utility), water main (for a water supplier), etc. A meter 208 is connected in series with the utility distribution conduit 206, between the utility provider 202 and the building 294, and is adapted to measure the amount of electric, gas, water, etc., being consumed for that location.

Preferably, the meter 208 is a smart meter having the capability to transmit real-time data relating to utility usage to the utility data puller 102, via a communication network 210 (e.g., the Internet), either wired (e.g., Ethernet, local area network, etc.) or wirelessly (e.g., IEEE 802.11, infrared, optical, radio frequency (RF), microwave, etc.). Exemplary utility meters and related metering components suitable for use with embodiments of the invention include, but are not limited to, EKM smart meters (e.g., EKM-Omnimeter II v. 3 UL or EKM-Omnimeter Pulse UL v. 4, manufactured by EKM Metering Inc. of Santa Cruz, Calif.), Ether smart meters (manufactured by ETHER Applications Ltd. of Athens, Greece), Badger smart meters (e.g., Badger E-Series Ultrasonic smart water meters, manufactured by Badger Meter of Milwaukee, Wis.), Reactel telephone-based automated meter reading (AMR) system (manufactured by Reactel, Inc.), point-of-use (POU) metering devices, and Vata Verks metering devices.

Optionally, the meter 208 also has the capability to receive certain commands or other control signals for controlling an operation of the meter. In one or more embodiments, the meter 208 includes a transceiver for wirelessly communicating with the communication network 210, although a wired communication connection (e.g., Ethernet) is similarly contemplated. The meter 208 may be configured to broadcast real-time and/or historic utility usage data at prescribed intervals (e.g., hourly), for example in data pushing application. Alternatively, the meter 208 may be configured to broadcast real-time utility usage data in response to a data request or other control signal transmitted by the utility data puller 102 and received by the meter, such as in a data pulling application. In a data pulling scenario, for example, the system may use a Modbus protocol (originally published by Modicon, now managed by the Modbus Organization, Inc.), or an alternative serial communications protocol; Modbus uses the RS-485 standard for its physical layer. The meter 208 may be uniquely addressable by the utility data puller 102, which can be advantageous in distinguishing which meter is transmitting data when multiple meters are connected in the same line, such as in a sub-metering scenario.

Figure 3:
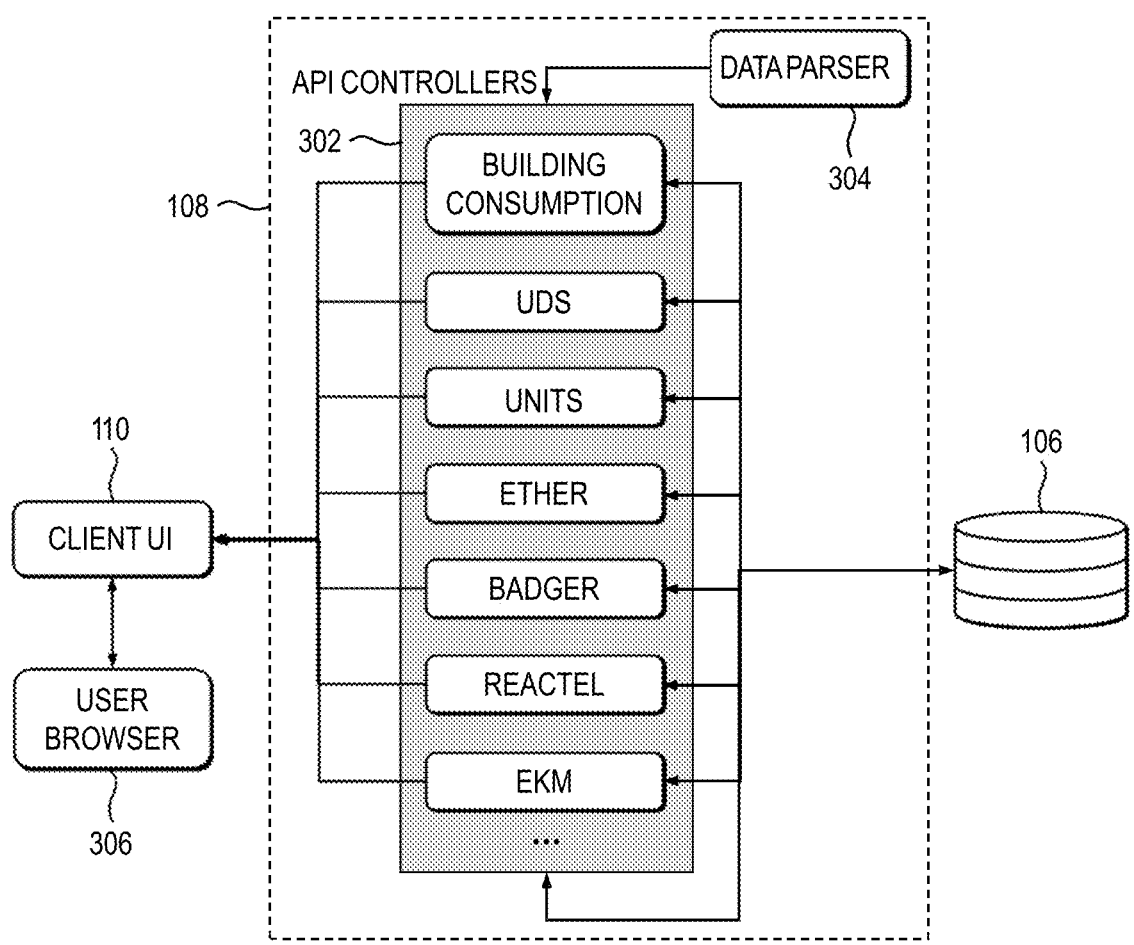
FIG. 3 is a block diagram depicting exemplary details of at least a portion of the third server and related components and connections shown in FIG. 1, according to one or more embodiments of the present invention.

FIG. 3 is a block diagram depicting exemplary details of at least a portion of the third server 108 and related components and connections shown in FIG. 1, according to one or more embodiments of the invention. As apparent from FIG. 3, the third server 108 is configured to execute a plurality of API controllers 302, each API controller being defined as a modular piece of software that fulfills one or more user requests (e.g., requests received from the client UI 110), depending on the type of data requested. In this illustrative embodiment, the API controllers 302 include, but are not limited to, a building consumption controller, a Utility Data System (UDS) controller, a Units controller, an Ether controller, a Badger controller, a Reactel controller, and an EKM controller (manufactured by EKM Metering Inc. Santa Cruz, Calif.), among other controllers. Each of the software controllers 302 is preferably configured to manage and direct the flow of data and web requests. The API controllers 302 are in operative communication with the client UI 110 and the data store 106.

The third server 108 further includes a data parser 304 operatively coupled with the API controllers 302. The data parser is configured to parse and/or aggregate user-requested data into a prescribed format(s) usable by a front end of the system 100 (e.g., client UI 110). As previously stated, the client UI 110 handles user requests, including user requests to retrieve and display prescribed data to the user. Such use requests may be passed to the client UI 110, for example, via a user browser 306, or other data input module. The client UI 110 may also be configured to generate a web page or other graphical display for presenting information requested by the user in a prescribed format. In some embodiments, the user may selectively control the type and/or manner in which the utility information (e.g., consumption, analytics, etc.) is presented.

Figure 4:
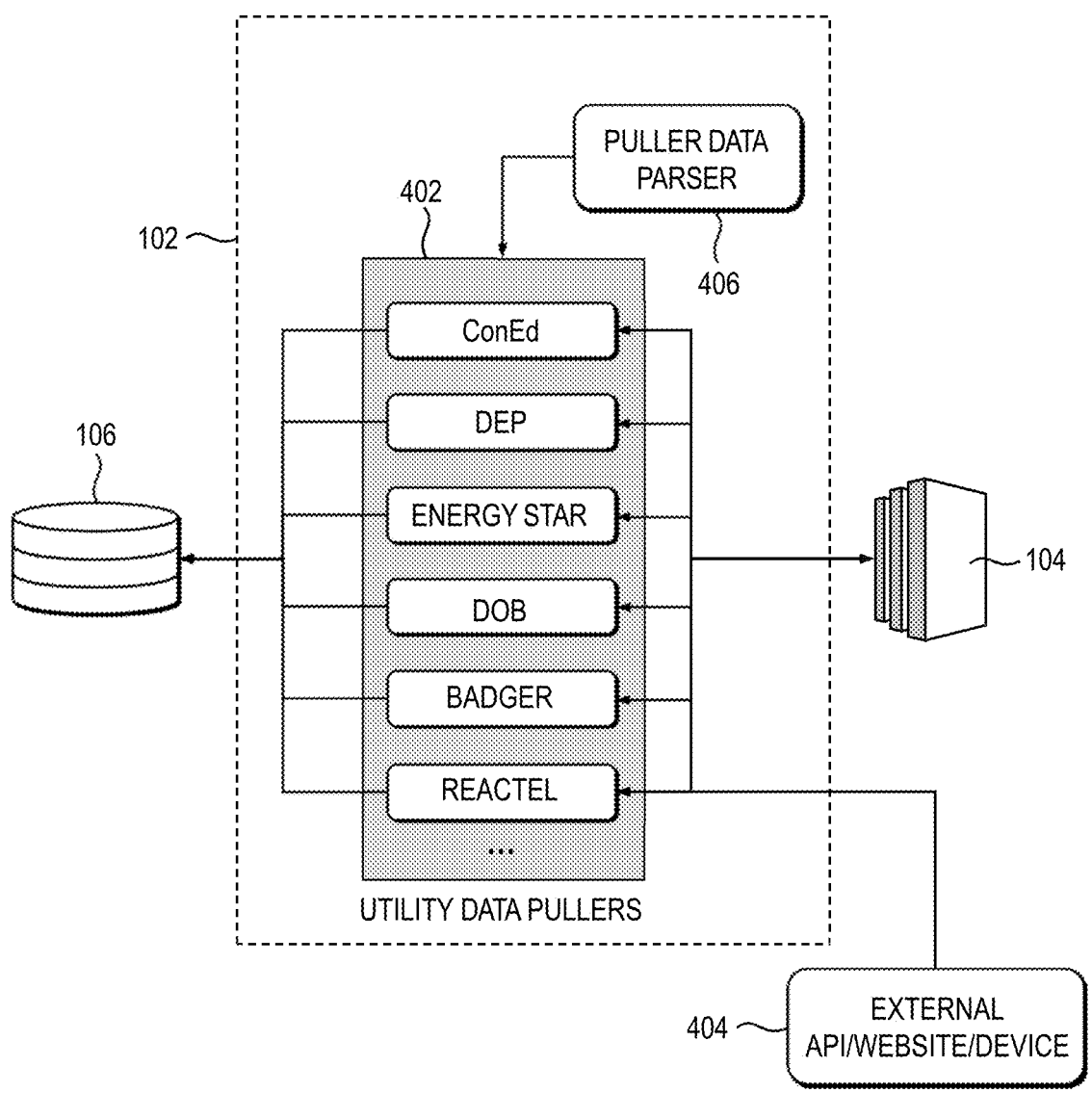
FIG. 4 is a block diagram depicting exemplary details of at least a portion of the first server and related components and connections shown in FIG. 1, according to one or more embodiments of the present invention.

FIG. 4 is a block diagram depicting exemplary details of at least a portion of the first server 102 (utility data puller) and related components and connections shown in FIG. 1, according to one or more embodiments of the invention. In this illustrative embodiment, the first server 102 comprises a plurality of utility data pullers (i.e., data extractors) 402, each data puller preferably defined as an individual software module running on the first server that is configured to extract utility data from a corresponding API, website(s), hardware device(s) (e.g., customer premises meters or sub-meters), etc., associated with a given utility/organization using the communications protocol established by the given utility/organization. Such data pullers may include, by way of example only, data pullers configured to extract relevant data from Consolidated Edison, the DEP, Energy Star, NYC Department of Buildings (DOB), Badger and Reactel, among other data sources.

One or more of the utility data pullers 402 may also be adapted to extract relevant utility data from at least one external data source 404, which may include, for example, an external API(s), website(s) and/or device(s). In one or more embodiments, the external data source 404 may include, but is not limited to, one or more APIs (e.g., EKM software, Energy Star Portfolio Manager, Dark Sky API, DOB, Ionit Networks, etc.), websites (e.g., American Water, Badger Meters, Cleveland Water, ConEd, Department of Environmental Protection, National Grid, PSEG, Suez, Uinet, etc.), and devices/hardware (e.g., EtherMeter®, a registered trademark of SCADAmetrics of St. Louis, Mo., Vata Verks metering device, manufactured by Vata Verks Inc. of Arlington, Mass., Reactel, H2O Degree submetering devices, manufactured by H2O Degree of Bensalem, Pa.).

The first server 102 further includes a puller data parser 406 in operative communication with the utility data pullers 402. Similar to the data parser 304 shown in FIG. 3, the puller data parser 406 preferably comprises software configured to receive data from the utility data pullers 402, each in its own format, and convert such data into a format that is more easily usable by the system 100. In one or more embodiments, the puller data parser 406 is configured to deconstruct the data received from the various utility data pullers 402 and to generate individual data streams including utility consumption information, which allows customers to beneficially analyze and diagnose costly usage inefficiencies in real time to optimize their utility usage. A majority of the data pullers 402 utilize Hypertext Transfer Protocol (HTTP) as the communication protocol for retrieving data. For data pullers using HTTP, no bit processing is required. Alternatively, other types of data pullers 402, such as, for example, by Vata Verks, Ether meters, and Reactel, may require bit parsing, as the data is obtained directly from the device themselves.

Figure 5A:
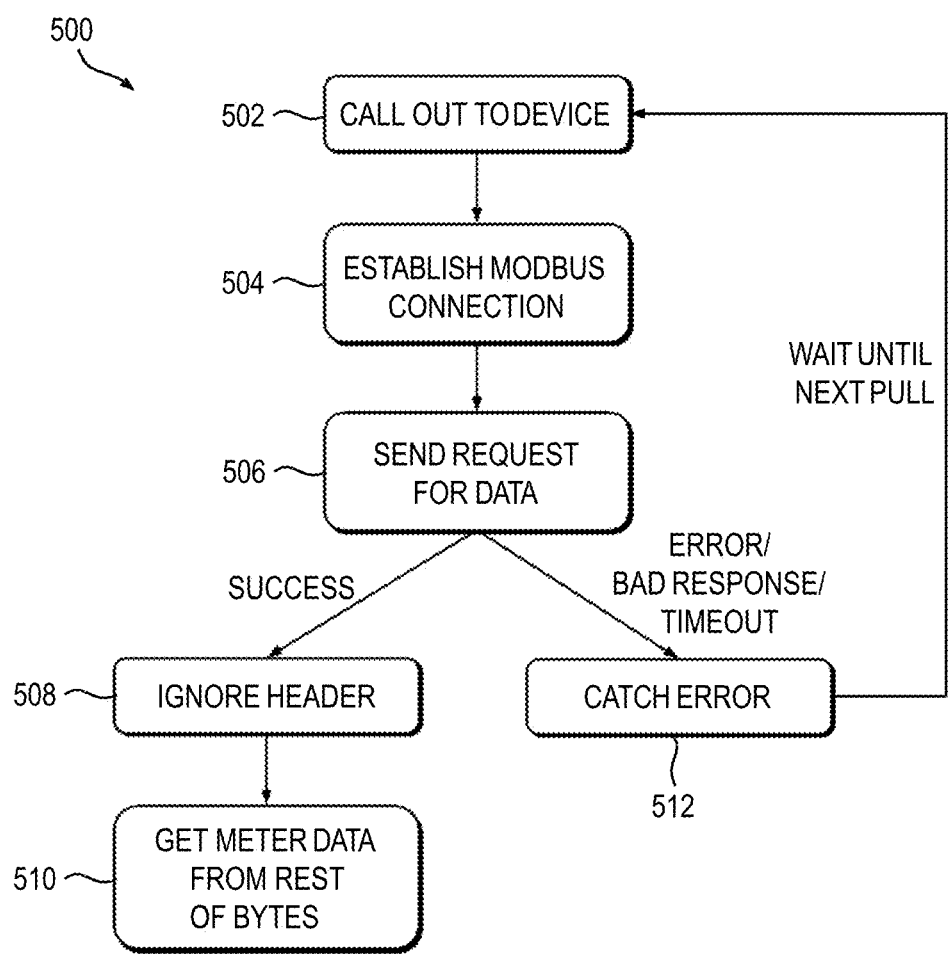
FIGS. 5A and 5B are flow diagrams depicting at a least a portion of exemplary data pulling routines for a Vata Verks/Ether metering device and a Reactel device, respectively.

By way of example only and without limitation, Vata Verks and Ether meter data pullers primarily retrieve data via a Modbus protocol. A general data pulling method 500 that may be implemented by a data puller 402 for pulling data using the Modbus protocol is shown in FIG. 5A. The method 500 begins by initiating a call to the device in step 502. In step 504, a Modbus connection is established with the Vata Verks/Ether meter device via a transmission control protocol/Internet protocol (TCP/IP) socket. Once the Modbus connection has been established, the data puller sends out a request for data to the device in step 506. If successful, the device will send a data packet via the Modbus connection to the data puller, which ignores the header (first 9 bytes) in step 508 and extracts the device data in step 510 from the remaining bytes (21 bits for Ether meter, 17 bits for Vata Verks meter). If unsuccessful, either due to an error, a bad response, or a timeout condition, for example, the method 500 will proceed to a catch error step 512, where the method waits until a next data pull, after which the method proceeds to step 502 and the process is repeated.

Figure 5B:
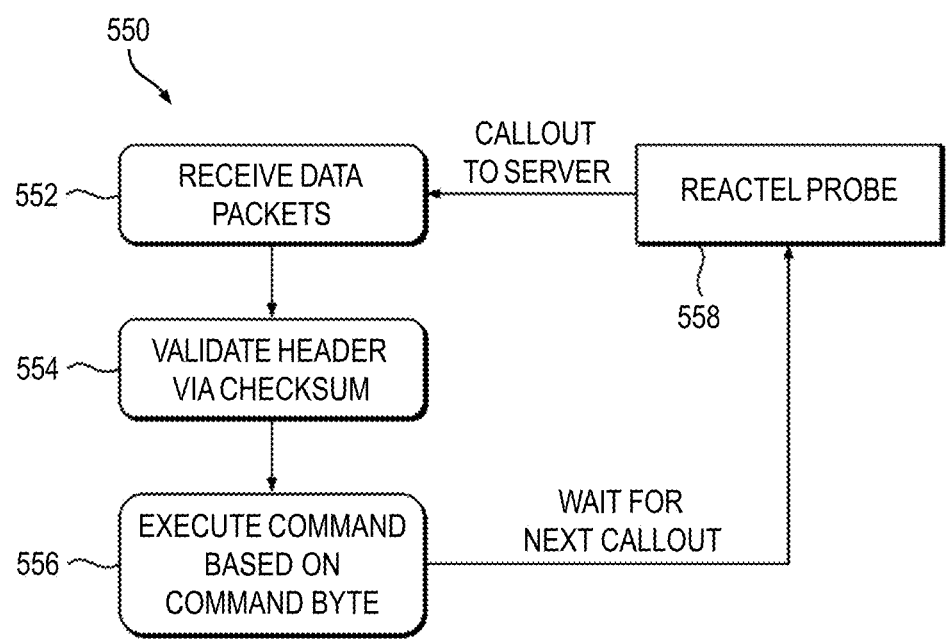

With reference now to FIG. 5B, an exemplary method 550 is shown which may be used by a data puller for retrieving data from a Reactel device. The Reactel data puller preferably utilizes a User Datagram Protocol/Internet Protocol (UDP/IP) listener which is continuously open to receiving data packets from each Reactel probe. In step 552, the Reactel data puller is configured to receive data packets from a Reactel probe. For each data packet received, the header (first 8 bytes of the data packet) is validated in step 554 via a checksum (last 2 bytes of the header and body). In step 556, the Reactel data puller executes a command byte (first byte of body); the remaining bytes of the body contain the Reactel probe data. The method 550 then waits for a next call out from the Reactel device 558 to the server, after which the method 550 proceeds to step 552 and the process is repeated.

Data generated by the first server 102 is preferably stored in the data store 106 coupled with the first server 102 for subsequent use by the third server 108. Larger and more complex data sets extracted by the first server 102 are preferably sent to the second server 104 for further processing. Such further processing may include, for example, performing complex data analytics based on the extracted utility data.

Figure 6:
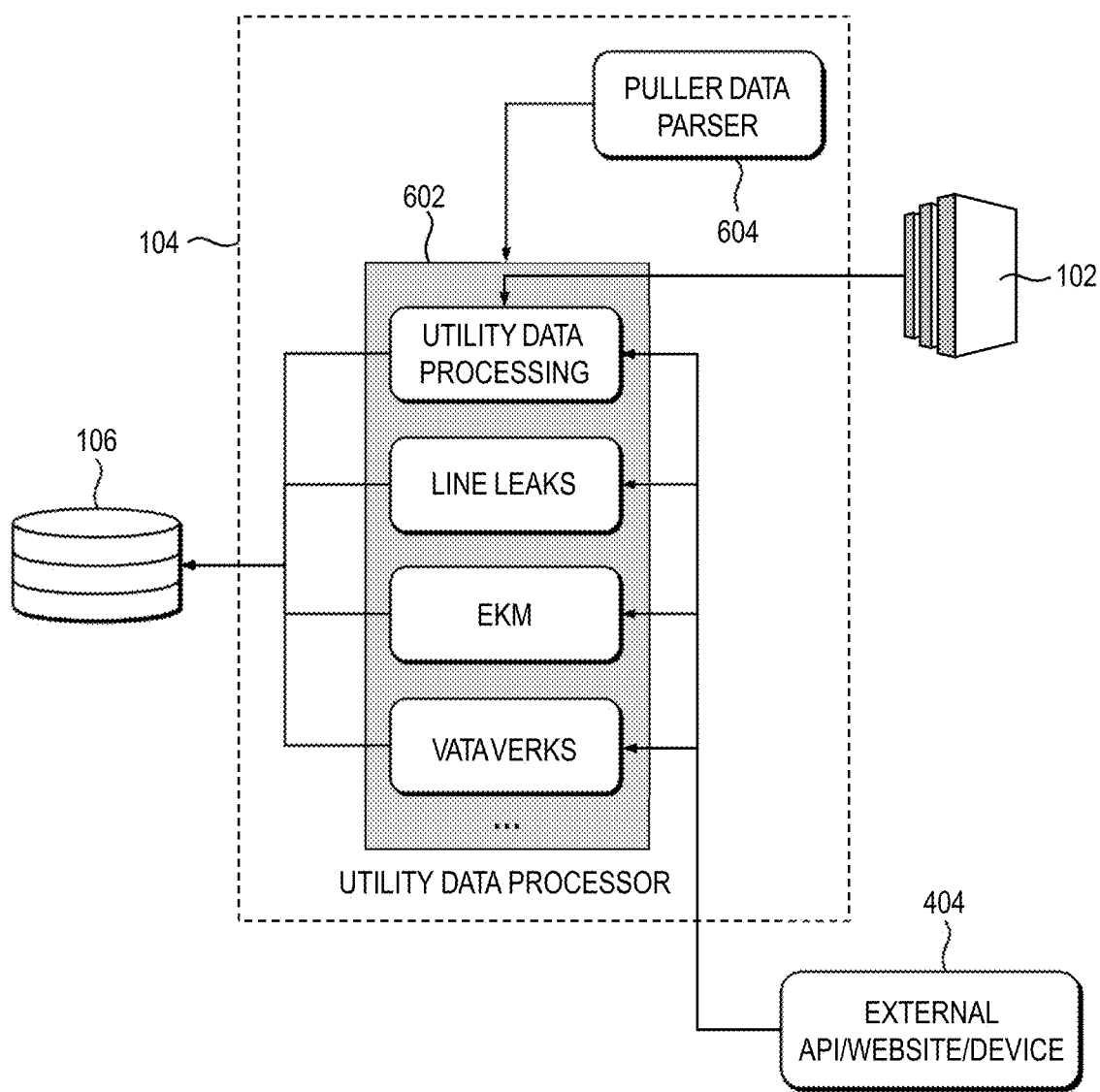
FIG. 6 is a block diagram depicting exemplary details of at least a portion of the second server present and related components and connections shown in FIG. 1, according to one or more embodiments of the present invention.

FIG. 6 is a block diagram depicting exemplary details of at least a portion of the second server 104 (utility data processor) and related components and connections shown in FIG. 1, according to one or more embodiments of the invention. As previously stated, larger and more complicated data sets and/or data calculations retrieved by the first server 102 are preferably passed to the second server 104 for further processing. The second server 104 includes at least one utility data processor 602 configured to run one or more software modules and algorithms for performing data analytics using this retrieved data, such as, for example, a utility data processing module, a line leaks module, an EKM module, and a Vata Verks module (Vata Verks water and gas usage sensors, manufactured by Vata Verks Inc., Arlington, Mass.). For example, in one or more embodiments, there are at least three calculations performed by the second (processing) server 104: (i) line leak detection by parsing building lines on the system and calculating increases in water usage; (ii) parse bundle of DEP utility data retrieved from the first (data pulling) server 102 into sets of data based on time granularity; and (iii) calculate utility and cost saving statistics based on set targets for all buildings. Water usage calculations may be performed, in some embodiments, using data collected by metering devices installed on water lines in the building.

Like the first server 102, the second server 104 may utilize data retrieved from an external data source 404, which may include, for example, an external API(s), website(s) and/or device(s). One or more data streams generated by a puller data parser 604, from deconstructed data received from the various utility data pullers (402 in FIG. 4), is supplied to the utility data processor 602. In one or more embodiments, the puller data parser 604 may be the same as the puller data parser 406 (FIG. 4) residing in the first server 102. Output information generated by the utility data processor 602 is preferably stored in the data store 106 coupled with the second server 104 for subsequent use by the third server (108 in FIG. 1).

The first, second and third servers 102, 104, 108 shown in FIG. 1 preferably reside at a host site, and customers/users are able to access the utility usage information by connecting to the system 100 at the host site. There are multiple ways in which clients and users connect to the system, depending on the type of service. In one or more embodiments, each client will have their company, for a commercial client, and building(s) entered into the system by the host, for example through a host website or other data entry application, to establish a customer account. Customer building and contact information pertaining to the customer account may be maintained in the data store 106, or other storage medium.

Hardware, including smart meters (e.g., EKM, Ether, Badger, Reactel, etc.) and sensors (e.g., Vata Verks, etc.), installed at the customer premises are then entered into the host system and associated with the customer account. Once entered into the system, the hardware will begin recording utility consumption data. The utility consumption data recorded by the customer premises hardware is sent to the host system, either by the host system periodically sending requests to the customer hardware, or by the customer hardware automatically transmitting the data at prescribed intervals. For example, the host system (100 in FIG. 1) may send requests for utility usage data to the customer hardware (e.g., smart meter 208 in FIG. 2) in the form of HyperText Transfer Protocol (HTTP) requests transmitted over the Internet, or messages using an alternative protocol may be sent over the network through which communications between the system and customer/user are established (e.g., 112 in FIG. 1, or 210 in FIG. 2).

Similarly, customers can access real-time utility usage data, either by the host system periodically sending usage data to a customer computing device (e.g., premises computer, mobile device, etc.), or by the customer sending a request for such data over the communication network. The granularity of the data that the customer/user is able to access from the system will be dependent on the type of hardware installed at the customer premises.

In one or more embodiments, the customer may also connect to the system by providing login information for their utility provider's website to the host. This login information will be entered into the host system and associated with the customer account, thereby enabling the host system to begin pulling usage and billing data from the various utility providers using, for example, HTTP requests.

Figure 7A:
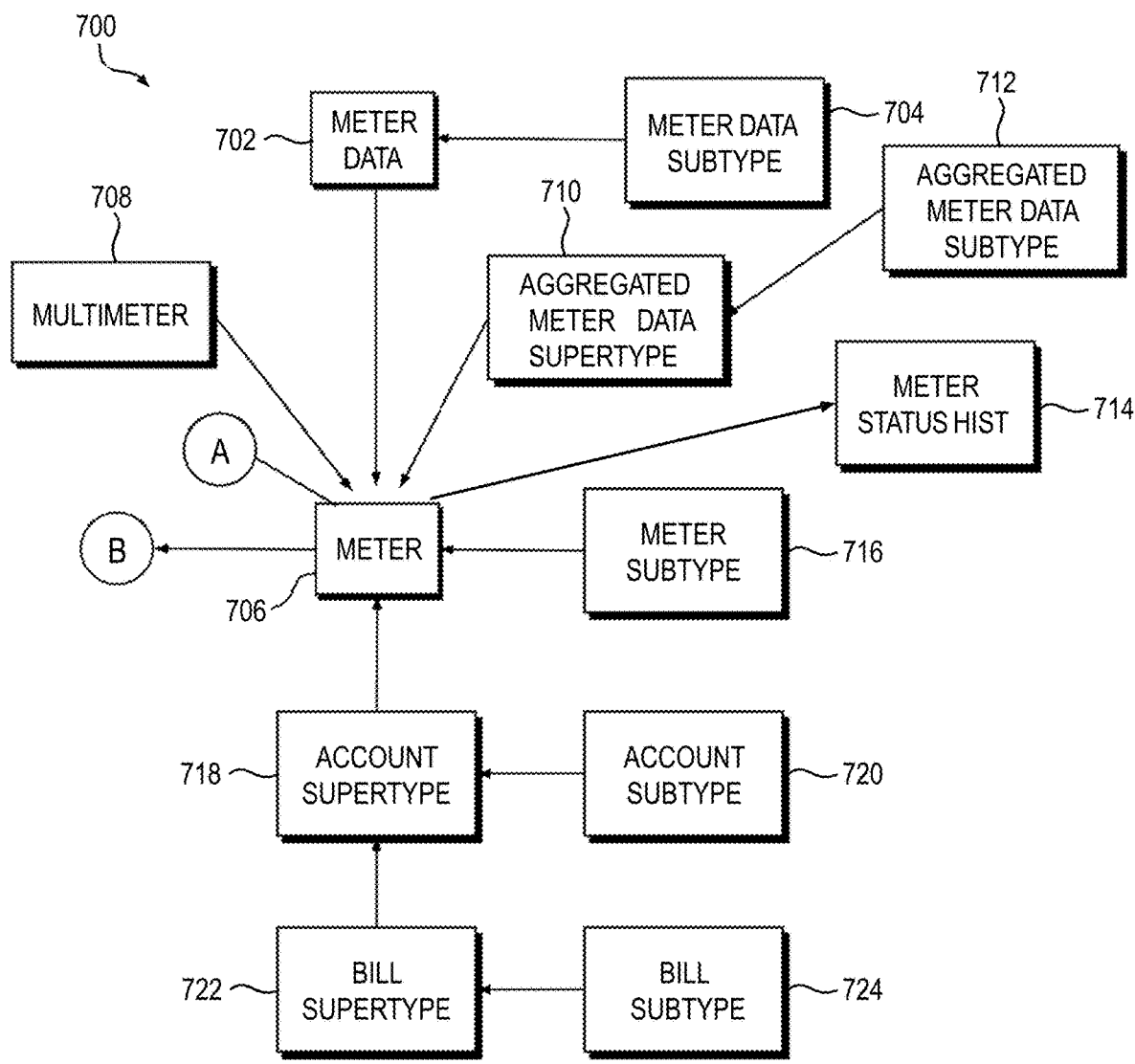
FIGS. 7A and 7B are flow diagrams depicting at least a portion of exemplary logical relationships between data tables used in a self-service registration feature performed by the illustrative system shown in FIG. 1, according to one or more embodiments of the present invention.
Figure 7B:
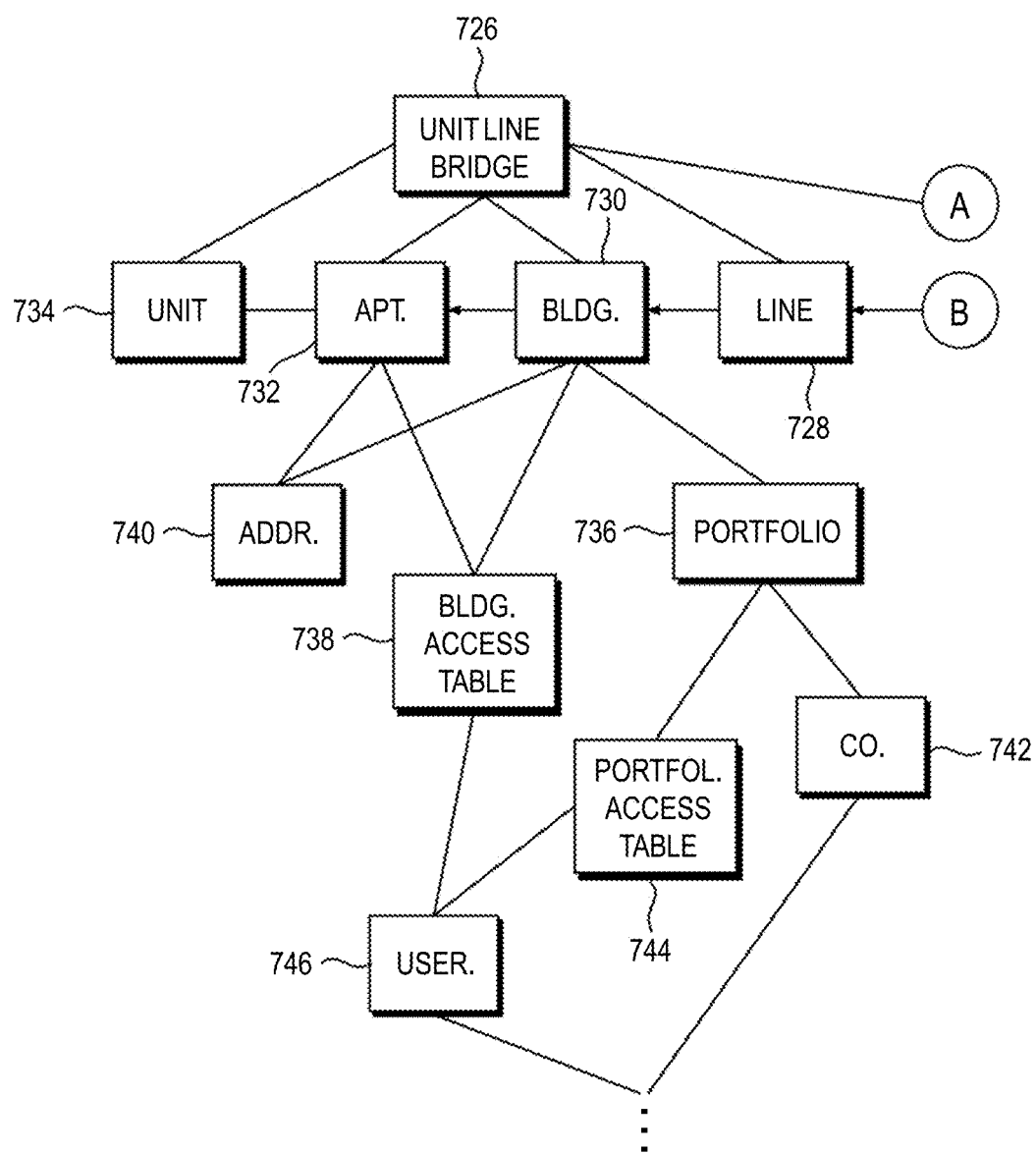

Turning now to FIGS. 7A and 7B, a flow diagram 700 depicts at least a portion of some exemplary logical relationships between data tables used in a self-service registration feature performed by the illustrative system 100 shown in FIG. 1, according to one or more embodiments of the invention. More particularly, the diagram 700 shows the high-level access logic in order for hardware devices to be associated to buildings/units and allow customers/users (commercial or residential) access to utility consumption data and analytics. FIGS. 7A and 7B are logical relationships that are enforced by the database (106 in FIG. 1). FIG. 7A shows how the data tables holding meters and meter data are associated; FIG. 7B shows the data table associations required for data access for users who will be employing a self-service registration feature according to an embodiment of the invention. These relations govern how the user will be able to interact with and access utility data via the UI. The relations shown in FIGS. 7A and 7B reside in the database (106 in FIG. 1), whereas the software code that will utilize these relations and handle user requests related to the self-service registration feature will reside in the third (dashboard) server 108 (FIG. 1).

Referring now to FIG. 7A, the logical relationship diagram 700 shows a meter data module 702 configured according to a received meter data subtype 704. Since the system is adapted to extract utility usage data from multiple different types of monitoring devices, the meter data module 702 is preferably configured to abstract a similar schema across all of the different types of monitoring devices, represented by a utility meter table 706; a "table," as the term is used herein, is intended to refer broadly to a mapping instance. Thus, the utility meter table 706 essentially holds multiple inputs, preferably associated with corresponding smart meters capable of transferring data to a processor/server over a communications network. Data associated with the utility meter table is stored in the meter data module 702.

A multimeter table 708, which preferably represents a model for devices that takes multiple inputs for multiple lines (e.g., EKM, Ether and Reactel devices), is mapped and linked to at least a subset of the multiple inputs held in the utility meter table 706. Specifically, the utility meter table 706 holds devices that take only a single input and considers each input of the multimeter table 708 as a separate device. Each input in the utility meter table 706 is associated with a respective multimeter in the multimeter table 708. An aggregated meter data supertype module 710, which represents a general model for aggregated meter data, is also mapped and linked to at least a subset of the multiple inputs held in the utility meter table 706. More particularly, the aggregated meter data supertype module 710 holds aggregated utility data that all devices share regardless of device type. An aggregated meter data subtype module 712 holds aggregated meter data that is more specific to the type of device, and this data is provided (mapped) to the aggregated meter data supertype module 710. A meter status history module 714 is configured to store historical and current device status data, regardless of device type, obtained from the utility meter table 706. A meter subtype module 716 holds information/details more specific for each type of device and supplies such data to the utility meter table 706.

With continued reference to FIG. 7A, the utility meter table 706 is further configured by an account supertype module 718. The account supertype module 718 represents a general model for utility company accounts of system users that is configured to store information that all accounts share, regardless of the company. An account subtype module 720 holds and provides, to the account supertype module 718, information more specific to the utility company (e.g., ConEd, DEP, PSEG, etc.). A bill supertype module 722, which represents a general model for utility company billing data, is coupled with and holds data for the associated account supertype module 718. The bill supertype module 722 holds data that all bills share, regardless of the bill type/company. A bill subtype module 724 holds and provides, to the bill supertype module 722, data that is more specific to the type of bill/company (e.g., ConEd, DEP, PSEG, etc.).

With reference now to FIG. 7B, a unit line bridge 726 is provided in which at least a portion of the first, second and third servers 102, 104, 108 in the illustrative system 100 of FIG. 1 reside. The unit line bridge 726 is preferably configured to obtain utility usage data relating to one or more of a line table 728, building table 730, apartment table 732, and unit table 734 with which the unit line bridge is in operative communication. The unit line bridge 726, in one or more embodiments, is also configured to communicate with the utility meter table 706 (shown in FIG. 7A), and in turn the utility meter table is in operative communication with the line table 728 for monitoring and/or controlling utility consumption associated with any of the line table, building table 730, apartment table 732 and/or unit table 734.

With continued reference to FIG. 7B, a portfolio module 736 is provided which is configured to store building portfolios for a company. In one or more embodiments, each building within the building table 730 is associated with a portfolio. A building access table 738 holds access rights for each user (not associated with a company). These access rights are used to determine whether a given user is provided access by the system to data for a building 730 or apartment 732, for example. An address module 740 is provided which is configured to store address information relating to a building 730 or apartment 732, for example. A company module 742 is provided which is configured to store company information. Portfolios 736, and by extension building table 730, may be associated with a company. In some embodiments, a user owns a personal house, which is a building not associated with a company. A user may also be associated with a company, depending on if he or she is a single user or enterprise user. A portfolio access table 744 holds access rights for a user to determine whether a user is able to access buildings within a portfolio. A user module 746 stores all details relating to a user, including, for example, email address, password, company (if any), etc. Additional modules may be provided and customized for a particular application.

Figure 8:
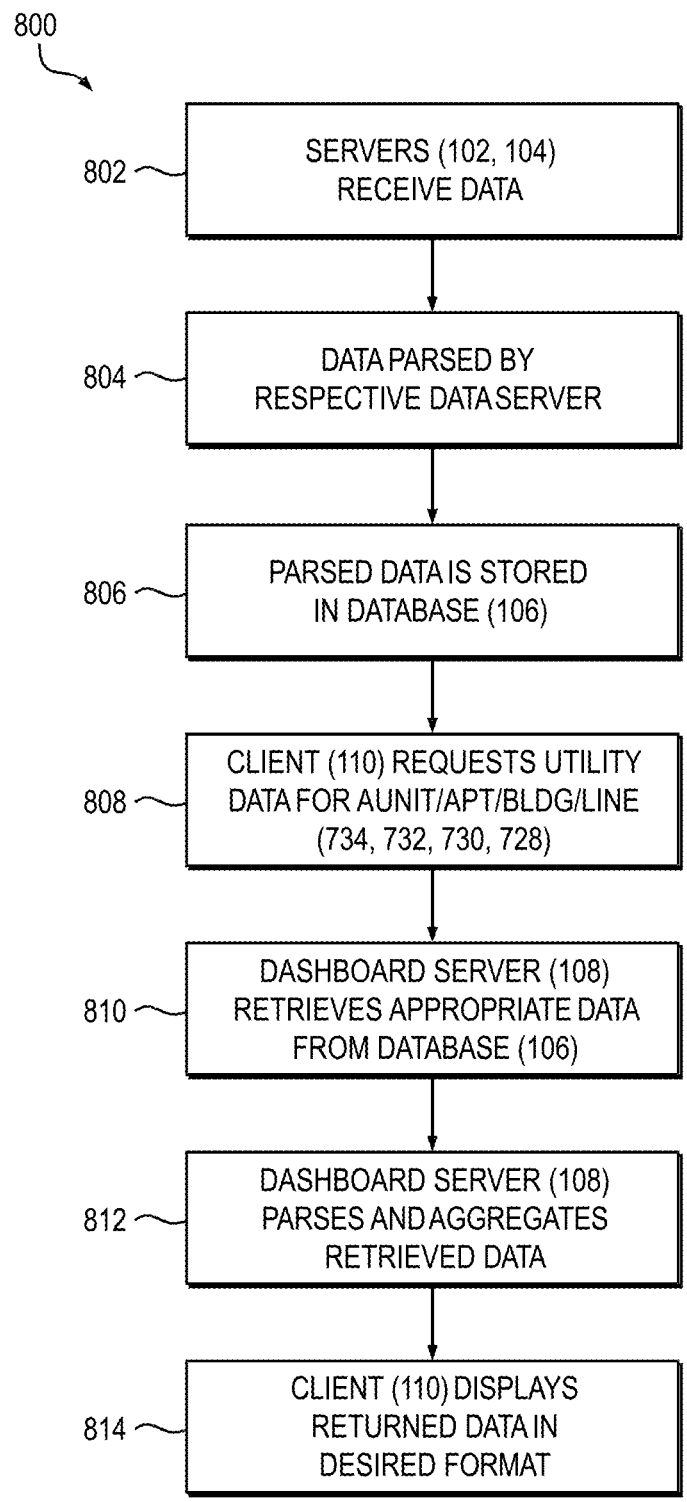
FIG. 8 is a flow diagram depicting at least a portion of an exemplary method for monitoring and controlling multiple utility consumption in a building, according to one or more embodiments of the present invention.

FIG. 8 is a flow diagram depicting at least a portion of an exemplary method 800 for monitoring and controlling multiple utility consumption in a building, according to one or more embodiments of the invention. In step 802, one or more system servers (e.g., servers 102, 104 in FIG. 1) receive data. This can be achieved by sending a request to a utility device (smart meter or the like), for example in a data pull procedure, or having the device initiate a call into the server(s), for example in a data push procedure, depending on the type of device.

Next, data is parsed by a respective one of the system servers in step 804. More particularly, the data may be parsed in either a puller server (e.g., 102 in FIG. 1) or a processing server (e.g., 104 in FIG. 1), depending on the type of utility device. The parsed data is then stored in a database (e.g., 106 in FIG. 1) in step 806. In one or more embodiments, utility device data is held in the meter data table 702 or meter data subtype table 704 (FIG. 7A). Utility bills and billing data are held in the bill supertype table 722 and/or bill subtype table 724 (FIG. 7A).

In step 808, a client (e.g., 110 in FIG. 1) requests utility data for a given unit/apartment/building/line (e.g., 734, 732, 730 or 728, respectively, in FIG. 7B). Access to the requested utility data is granted based at least in part on information held in the building access table 738 (FIG. 7B). Thus, in one or more embodiments, a determination is made by the system in step 808 regarding whether certain access criteria associated with the requesting client matches corresponding access information associated with the particular building (i.e., unit/apartment/building/line) for which utility consumption information is being requested. Such access determination can be made, for example, by comparing access information held in the building access table 738 with identification information pertaining to the requesting client.

In response to the client request, a dashboard server (108 in FIG. 1) retrieves the appropriate data from the database (106 in FIG. 1) in step 810. The dashboard server parses and aggregates the retrieved data in step 812 and returns the data to the requesting client. In step 814, the client displays the returned data in a desired format. The client may take one or more actions in response to the displayed utility data for controlling utility consumption in the given unit/apartment/building/line.

A system according to embodiments of the invention is configured to control multiple devices (in various locations) simultaneously and in real-time. Hence, the system enables a user to configure the automation of recording utility data usage from multiple metering devices in a building. The system, in one or more embodiments, automatically and periodically (as controlled by the user) sends a signal to each of a prescribed number of metering devices in the building, preferably according to a predetermined schedule. This signal prompts each of the corresponding metering devices to reply by transmitting to the system utility usage data of the type and format associated with the respective metering devices. The system then processes this data and calculates the usage, preferably in the time interval between requests for metering data.

By way of example only and without limitation, the system according to one or more embodiments of the invention allows a user to configure an Ether meter that is installed in their building. Typically, the data recorded by the Ether meter device is accessible only on the device itself. However, configuring the device using the system according to aspects of the invention enables the system to routinely send a signal to the particular device(s), and the device responds by transmitting the current read data it has recorded. The system receives this data from the Ether meter, automatically serializes the data into a human readable format, and calculates building usage information in the interval between meter reads. This usage information is then stored in memory by the system for further processing.

In some embodiments, the system for monitoring and controlling utility consumption in a building provides users with a way to remotely configure settings directly on a utility device. After configuring the utility device from the system, utility usage data is able to be automatically pushed to the system from the device for processing and storage. By way of example only, consider a user who has an unconfigured Reactel device in a building, with multiple utility meters coupled to respective inputs of the Reactel device. The inputs of the Reactel device have specific settings that must be configured to properly read the coupled meters; these settings can only be configured programmatically. Using the system according embodiments of the invention, a user configures these inputs for the Reactel device and sets a callout interval (i.e., the time interval in which the Reactel device pushes data to the system).

Conventionally, the data recorded by a given utility device is only accessible on the device itself, as previously stated. However, after configuring the device through the system, the data read by each device can be routinely pushed from the meter inputs to the system. The system is adapted to receive data from each device, automatically serialize the data into a human readable format, and calculate utility usage in the interval between reads.

In one or more embodiments, at a user's request the system for monitoring and controlling utility consumption in a building uses recorded/stored formatted data to automatically generate data visualizations and data aggregated reports in user-selected time intervals for as many devices as the user has on the system, including devices residing in multiple buildings. In some embodiments, when reading data from a device using previously recorded data, the system calculates and detects abnormal utility usage, such as, for example, probable leaks, etc., based on utility-specific algorithms and is configured to automatically generate and send alerts or other notifications (e.g., sent via email, short message service (SMS) texts, etc.) to user computers and/or mobile devices (e.g., smart phone).

By way of example only and without limitation, consider a scenario in which a probable leak is detected in a building by the system according to embodiments of the invention. In this illustrative scenario, a user is subscribed to receive leak or other emergency alerts/notifications and is assumed to have Ether meters in their building(s). The system according to embodiments of the invention transmits a signal to a given metering device (on a predetermined schedule or manually) and receives data from the given device. Using the received data, the system preferably runs an algorithm and determines that there is a probable leak based on utility usage anomalies relative to a previous predetermined time interval (e.g., past few hours). For example, the system may compare a real-time gas usage reading with recorded gas usage readings over the past several hours and determine that there is a marked increase in consumption with all building conditions being essentially the same. The system then automatically sends out a notification to the user (e.g., via email SMS text, etc.) to notify the user of the probable gas leak, including, in some embodiments, a likely location of the leak.

In one or more embodiments of the invention, the system for monitoring and controlling utility consumption in a building is beneficially configured for integration with building environmental/control equipment, including, for example, a building management system (BMS), heating, ventilation and air-conditioning/cooling (HVAC) system, lighting control system, water valve, gas valve, smart home devices, etc. The system according to embodiments of the invention is adapted to automate the control and configuration of such building environmental/control equipment in response to one or more prescribed conditions, including, but not limited to, time of day (e.g., morning or afternoon), season (e.g., winter or summer), weather forecasts, number and/or location of occupants in a building, anomalies in utility usage, etc.

Figure 9:
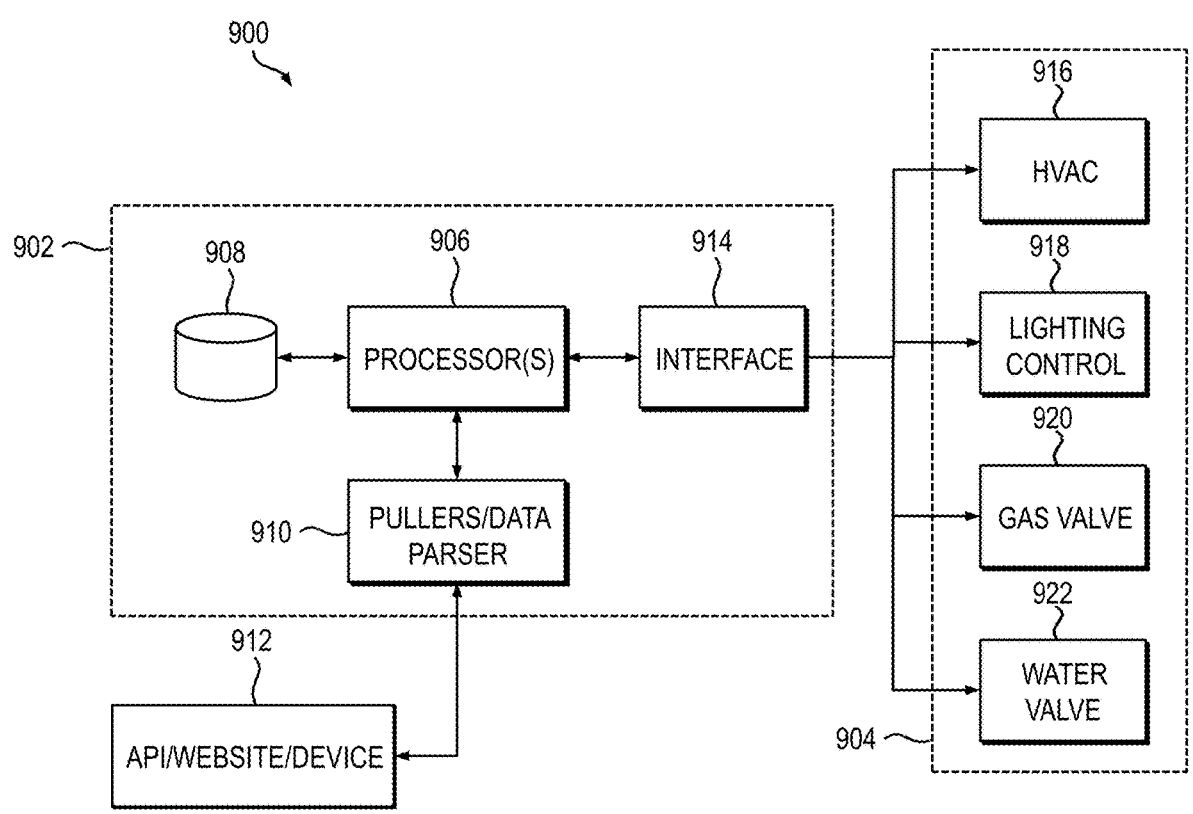
FIG. 9 is a block diagram conceptually depicting at least a portion of a system for monitoring and controlling multiple utility usage in a building integrated with building environmental and control equipment, according to one or more embodiments of the present invention.

FIG. 9 is a block diagram conceptually depicting at least a portion of an exemplary system 900 including a system 902 for monitoring and controlling multiple utility usage in a building integrated with building environmental and control equipment 904, according to one or more embodiments of the invention. With reference to FIG. 9, the system 902 for monitoring and controlling multiple utility usage in a building is preferably formed in a manner consistent with the illustrative systems according to embodiments of the invention, as shown in FIGS. 3, 4 and 6, for example. Specifically, the system 902, in this illustrative embodiment, includes one or more processors 906 and memory 908 (e.g., database) coupled with the processor(s). Historical data relating to building utility consumption, prescribed utility usage profiles, etc., may be stored in the memory 908, along with specific user account information (e.g., login criteria, etc.) and other data. The system 902 includes utility data puller(s)/puller data parser(s) 910 which, consistent with the utility data pullers 402 and puller data parser 406 shown in FIG. 4, preferably comprises software configured to receive data from utility data pullers associated with one or more buildings, each in its own format, and convert such data into a format that is more easily usable by the system 902. Similar to the system shown in FIG. 4, one or more utility data pullers may also be adapted to extract relevant utility data from at least one external data source 912, which may include, for example, an external API(s), website(s) and/or device(s).

The system 902 further includes an interface 914 coupled with the processor 906. The interface 914, in one or more embodiments, is coupled with the building environmental and control equipment 904 and is configured to generate signals for controlling the building environmental and control equipment in response to corresponding signals received from the processor 906. In one or more embodiments, the interface comprises at least one digital-to-analog converter (DAC) adapted to receive a digital signal from the processor 906 and convert the digital signal to an analog signal in a format (e.g., voltage signal level) suitable for use by a corresponding one of the building environmental and control equipment 904.

The building environmental and control equipment 904 preferably includes environmental control systems and devices used in maintaining the building environment within prescribed parameters, including, for example, humidity, temperature, lighting, etc. Such building environmental and control equipment 904 may include, for example, HVAC equipment 916, lighting control equipment 918, as well as devices used to control utility consumption in the building, such as, for example, gas valves 920 and water valves 922. Thus, when a probably water leak is detected by the system 902, such by the processor 906 comparing real-time utility usage with either historical utility usage information stored in the memory 908 or elsewhere, or with a predetermined utility usage profile, which may also be stored in the memory 908 or obtained externally (e.g., from an external API/website/device 912).

Thus, in an illustrative scenario in which a probable gas leak is detected by the system 902, based on the processor 906 comparing real-time utility usage readings received from the puller data parser 910 with previous utility consumption data stored in the memory 908, the processor automatically generates a signal provided to the interface 914, which in turn generates a signal transmitted to the gas valve 920 to thereby turn off gas flow to the building. The system 902 then automatically sends a notification to the user alerting the user of a probably gas leak and that gas flow to the building has been shut off until the source of the gas leak can be determined and corrected.

The present invention may be a system, a method, and/or a computer program product at any possible technical level of integration. The computer program product may include a non-transitory computer readable storage medium (or media) having computer readable program instructions embodied therein which, when executed by at least one processor, cause the processor to carry out aspects of the present invention.

The non-transitory computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not intended to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire or the air.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission routers, firewalls, switches, gateway computers and/or edge servers. A network adapter card or network interface in each computer/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example, through the Internet using an Internet Service Provider (ISP). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize and configure the electronic circuitry, in order to perform aspects of the present invention.

Aspects of the present invention are described herein with reference to flowchart instructions and/or block diagrams of methods, apparatus (systems), and computer program products according to embodiments of the invention. It will be understood that each block of the flowchart instructions and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a non-transitory computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. A general purpose computer, when configured in accordance with embodiments of the invention, becomes a special purpose computing apparatus.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram blocks or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be appreciated that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrations of embodiments described herein are intended to provide a general understanding of the various embodiments, and they are not intended to serve as a complete description of all the elements and/or features of apparatus, methods and systems that might make use of the techniques described herein. Many other embodiments will become apparent to those skilled in the art given the teachings herein; other embodiments are utilized and derived therefrom, such that structural and logical substitutions and changes can be made without departing from the scope of this disclosure. It should also be noted that, in some alternative implementations, some of the steps of exemplary methods described herein may occur out of the order described or noted in the figures (where shown). The drawings are also merely representational and are not drawn to scale. Accordingly, the specification and drawings are to be regarded in an illustrative rather than a restrictive sense.

Reference made throughout this specification to "one embodiment" or "an embodiment" is intended to mean that a particular feature, structure, or characteristic described in connection with the embodiment is included in at least one embodiment of the claimed subject matter. It is to be understood that appearances of the phrase "in one embodiment" or "an embodiment" are not necessarily all referring to the same embodiment. Furthermore, embodiments may be referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it is to be appreciated that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Terms such as "above" and "below," where used, are intended to indicate positioning of elements or structures relative to each other as opposed to absolute elevation.

The corresponding structures, materials, acts, and equivalents of any means or step-plus-function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit thereof. The embodiments were chosen and described in order to best explain principles and practical applications, and to enable others of ordinary skill in the art to understand the various embodiments with various modifications as are suited to the particular use contemplated.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, the claimed subject matter may lie in less than all features of a single embodiment. Thus, the following claims are hereby incorporated into the Detailed Description, with each claim standing on its own as separately claimed subject matter.

Given the teachings provided herein, one of ordinary skill in the art will be able to contemplate other implementations and applications of the techniques and disclosed embodiments. Although illustrative embodiments have been described herein with reference to the accompanying drawings, it is to be understood that illustrative embodiments are not limited to those precise embodiments, and that various other changes and modifications are made therein by one skilled in the art without departing from the scope of the appended claims.

What is claimed is:

1. A method for monitoring and controlling multiple utility consumption in a building, the method comprising:
   obtaining, by at least a first server, real-time utility usage data from a plurality of utility devices associated with the building;
   parsing the utility usage data obtained by the first server to generate individual data streams including utility consumption information;
   storing the individual data streams in a memory;
   obtaining, by at least a second server, at least a subset of the individual data streams from the memory based on a client request for the utility consumption information;
   parsing and aggregating, by the second server, at least the subset of the obtained individual data streams and returning the parsed and aggregated data streams to a requesting client; and
   displaying the parsed and aggregated data streams, presenting to the client information regarding the multiple utility consumption associated with the building in a prescribed format controlled by the client;
   wherein obtaining at least the subset of the individual data streams comprises determining whether certain access criteria associated with a requesting client matches corresponding access information associated with the building for which utility consumption information is being requested by comparing access information held in a building access table with identification information associated with the requesting client.

2. The method according to claim 1, further comprising the client taking one or more actions for controlling utility consumption in the building based at least in part on the displayed information regarding the multiple utility consumption associated with the building.

3. The method according to claim 1, wherein obtaining the real-time utility usage data from a plurality of utility devices associated with the building comprises at least one of sending, by the first server, a request to at least one of the utility devices in a data pull procedure, and receiving, by the first server, a call from at least one of the utility devices in a data push procedure, as a function of a type of utility device.

4. The method according to claim 1, wherein parsing the utility usage data is performed by at least one of a puller server and a processing server, as a function of a type of utility device.

5. The method according to claim 1, wherein parsing the utility usage data to generate the individual data streams comprises deconstructing data received from the plurality of utility devices to generate individual data streams including utility consumption information.

6. The method according to claim 1, wherein at least two of the plurality of utility devices are configured to communicate with the first server using different communications protocols, and wherein obtaining real-time utility usage data from the at least two utility devices is performed by the first server using the respective communications protocols associated with the at least two utility devices.

7. The method of claim 1, further comprising:
   storing, in the memory, utility usage data relating to historical utility consumption associated with the building;
   storing at least one prescribed utility usage profile in the memory; and
   generating, by at least one processor in the second server, one or more signals for controlling one or more corresponding building environmental and control equipment associated with the building based, at least in part, on a comparison of the real-time utility usage data with at least one of the stored utility usage data and the at least one prescribed utility usage profile.

8. The method of claim 7, wherein the building environmental and control equipment comprises at least one of heating, ventilation and air conditioning (HVAC) equipment, building management system (BMS) equipment, lighting control equipment, one or more gas valves and one or more water valves.

9. The method of claim 7, wherein the utility usage profile comprises threshold values relating to target environmental operational parameters associated with the building, and wherein the at least one processor is configured to generate the one or more signals for controlling one or more corresponding building environmental and control equipment when the real-time utility usage data exceeds one or more of the threshold values in the utility usage profile.

10. An apparatus for monitoring and controlling multiple utility consumption in a building, the apparatus comprising:
    a memory; and
    at least one processor coupled with the memory, the at least one processor being configured:
      to obtain, by at least a first server executing on the at least one processor, real-time utility usage data from a plurality of utility devices associated with the building;
      to parse the utility usage data obtained by the first server to generate individual data streams including utility consumption information;
      to store the individual data streams in the memory;
      to obtain, by at least a second server executing on the at least one processor, at least a subset of the individual data streams from the memory based on a client request for the utility consumption information;
      to parse and aggregate, by the second server, at least the subset of the obtained individual data streams and to return the parsed and aggregated data streams to a requesting client; and
      to send, to a display device coupled with the apparatus, the parsed and aggregated data streams presenting information regarding the multiple utility consumption associated with the building in a prescribed format controlled by the client;
    wherein the at least one processor is further configured to obtain at least the subset of the individual data streams by determining whether certain access criteria associated with a requesting client matches corresponding access information associated with the building for which utility consumption information is being requested, the processor determining whether the access criteria associated with the requesting client matches corresponding access information associated with the building by comparing access information held in a building access table with identification information associated with the requesting client.

11. The apparatus of claim 10, wherein the at least one processor is further configured to obtain the real-time utility usage data from a plurality of utility devices associated with the building by at least one of sending a request to at least one of the utility devices in a data pull procedure, and receiving a call from at least one of the utility devices in a data push procedure, as a function of a type of utility device.

12. The apparatus of claim 10, wherein the at least one processor is further configured to parse the utility usage data as a function of a type of utility device.

13. The apparatus of claim 10, wherein the at least one processor is further configured to parse the utility usage data to generate the individual data streams by deconstructing data received from the plurality of utility devices to generate individual data streams including utility consumption information.

14. The apparatus of claim 10, wherein the at least one processor is further configured:
to store, in the memory, utility usage data relating to historical utility consumption associated with the building;
to store at least one prescribed utility usage profile in the memory; and
to generate one or more signals for controlling one or more corresponding building environmental and control equipment associated with the building based, at least in part, on a comparison of the real-time utility usage data with at least one of the stored utility usage data and the at least one prescribed utility usage profile.

15. The apparatus of claim 14, wherein the building environmental and control equipment comprises at least one of heating, ventilation and air conditioning (HVAC) equipment, building management system (BMS) equipment, lighting control equipment, one or more gas valves and one or more water valves.

16. The apparatus of claim 14, wherein the utility usage profile comprises threshold values relating to target environmental operational parameters associated with the building, and wherein the at least one processor is configured to generate the one or more signals for controlling one or more corresponding building environmental and control equipment when the real-time utility usage data exceeds one or more of the threshold values in the utility usage profile.

17. A computer program product, comprising a non-transitory computer usable medium having computer readable instructions embodied therein, said computer-readable instructions adapted to be executed by at least one processor to implement a method for monitoring and controlling multiple utility consumption in a building, said method comprising:
obtaining, by at least a first server, real-time utility usage data from a plurality of utility devices associated with the building;
parsing the utility usage data obtained by the first server to generate individual data streams including utility consumption information;
storing the individual data streams in a memory;
obtaining, by at least a second server, at least a subset of the individual data streams from the memory based on a client request for the utility consumption information;
parsing and aggregating, by the second server, at least the subset of the obtained individual data streams and returning the parsed and aggregated data streams to a requesting client; and
displaying the parsed and aggregated data streams, presenting to the client information regarding the multiple utility consumption associated with the building in a prescribed format controlled by the client;
wherein obtaining at least the subset of the individual data streams comprises determining whether certain access criteria associated with a requesting client matches corresponding access information associated with the building for which utility consumption information is being requested by comparing access information held in a building access table with identification information associated with the requesting client.

\* \* \* \* \*